US006271524B1

(12) United States Patent
Wainer et al.

(10) Patent No.: US 6,271,524 B1
(45) Date of Patent: Aug. 7, 2001

(54) GAMMA RAY COLLIMATOR

(75) Inventors: Naor Wainer, Zichron Yaacov; Gideon Berlad, Haifa; Yaron Hefetz, Herzelia; Dov Maor, Haifa; Israel Ohana, Kiryat Tivon; Natan Hermony, Haifa, all of (IL)

(73) Assignee: Elgems, Ltd., Tirat Hacarmel (IL)

( * ) Notice: Subject to any disclaimer, the term of this patent is extended or adjusted under 35 U.S.C. 154(b) by 0 days.

(21) Appl. No.: 09/129,078

(22) Filed: Aug. 5, 1998

(51) Int. Cl.[7] .............................. G01T 1/164; G21K 1/02

(52) U.S. Cl. ................................ 250/363.03; 250/363.04; 250/363.1; 250/503.1; 250/505.1

(58) Field of Search ......................... 250/363.04, 363.05, 250/363.1, 363.03, 362, 503.1, 505.1; 378/145, 147, 149

(56) References Cited

U.S. PATENT DOCUMENTS

| | | | | |
|---|---|---|---|---|
| 5,210,421 | | 5/1993 | Gullberg et al. . | |
| 5,479,021 | * | 12/1995 | Morgan et al. | 250/363.4 |
| 5,591,976 | * | 1/1997 | Berthold et al. | 250/363.1 |
| 5,602,395 | | 2/1997 | Nellemann et al. . | |
| 5,638,817 | * | 6/1997 | Morgan et al. | 128/653.1 |
| 5,747,812 | * | 5/1998 | DiFilippo | 250/363.1 |
| 5,811,813 | * | 9/1998 | Maor | 250/363.05 |
| 5,834,780 | * | 11/1998 | Morgan et al. | 250/363.04 |
| 5,917,189 | * | 6/1999 | N'Guyen | 250/363.1 |
| 5,929,447 | * | 7/1999 | Crandall et al. | 250/363.1 |
| 5,936,247 | * | 8/1999 | Lange et al. | 250/363.03 |
| 6,008,494 | * | 12/1999 | Jansen | 250/363.09 |

FOREIGN PATENT DOCUMENTS

| | | | | |
|---|---|---|---|---|
| 60-214288 | * | 10/1985 | (JP) | 250/363.1 |
| 61-15376 | * | 4/1986 | (JP) | 250/363.1 |

OTHER PUBLICATIONS

"Performance Parameters of a Positron Imaging Camera", by Gerd Muehllehner et al., IEEE Transactions of Nuclear Science, pp. 528–537, vol. NS–23, No. 1, Feb. 1976.

"Performance parameters of a Longitudinal Tomographic Positron Imaging System", by Paans et al., Nuclear Instruments and Methods, vol. 192, pp. 491–500, Feb. 1, 1982.

"A Scanning Line Source for Simultaneous Emission and Transmission Measurements in SPECT", by Tan P., Bailey D.L., Meikle S.R., Eberl S., Fulton R.R., and Hutton B.F., J. Nucl. Med., 34(10), pp. 1752–60, (Oct. 1993).

* cited by examiner

*Primary Examiner*—Constantine Hannaher
(74) *Attorney, Agent, or Firm*—Paul Fenster; Christian Cabou

(57) ABSTRACT

A gamma ray collimator assembly comprising a first portion and a second collimator portion, the first and second portions having different gamma ray acceptance angles.

75 Claims, 16 Drawing Sheets

GAMMA RAY COLLIMATOR

FIELD OF INVENTION

The present invention relates generally to gamma ray detectors and specifically to gamma ray collimation in nuclear medicine.

BACKGROUND OF THE INVENTION

Gamma ray imaging is currently used in medicine to obtain 3D images of patients' internal organs. Positron Emission Tomography (PET) is a medical gamma ray imaging technique frequently used for this purpose. FIGS. 2A, 2B and 3 show representative prior art systems. Prior to an imaging procedure, a patient is given a radiopharmaceutical, which contains a positron emitting substance and which is selectively accumulated in a region of interest. When a positron emitted by the radiopharmaceutical encounters an electron, the electron-positron pair annihilates, emitting two gamma photons of 511 keV each, flying in opposite directions. The simultaneous detection of these two 511 keV gamma photons by two gamma detectors 40 positioned opposite to each other (as shown in FIG. 1), indicates that a positron has been emitted and annihilated inside an organ of a patient 500. The simultaneous attribution of 2D coordinates to each one of the photons allows for the determination of the photon's line of flight. The position of the annihilation is along this line. When a multitude of gamma photon pairs are detected and the information processed using appropriate algorithms, electronic circuitry, software, etc., a 3D image of the organ under examination is reconstructed.

Further and more detailed descriptions and analysis of PET will be found in "Performance Parameters of a Positron Imaging Camera", by Gerd Muehllehner et al., IEEE Transactions of Nuclear Science, Volume NS-23, No. 1, February 1976 and in "Performance Parameters of a Longitudinal Tomographic Positron Imaging System," by Paans et al., Nuclear Instruments and Methods, Volume 192, Nos. 2, 3, pages 491 –500, Feb. 1, 1982, the disclosures of which are incorporated herein by reference.

Low energy, stray, gamma photons, resulting from 511 keV gamma photons scattered within patient's body, are also present during coincidence measurements and may also reach one or both detectors. These scattered low energy gamma photons do not contain any usable and/or valid information. If these stray gamma photons are allowed to reach the detectors, they increase the count rate at the detector while not adding any usable information. These additional counts, while they may be rejected later, reduce the ability of the detector to detect "real" events, at a high rate.

Another problem encountered in coincidence gamma imaging concerns attenuation artifacts caused by absorption by the patient body and scattering. In order to correct for these effects, a 3D distribution of patient's absorption is preferably previously measured.

Attenuation may be measured (see FIG. 2A) by scanning patient 500 using a collimated line source 98 situated opposite a collimated detector 40 or two collimated line sources 98, opposite two collimated perpendicular detectors 40 and 40'. When attenuation and coincidence measurements are to be performed consecutively, the configuration of the apparatus has to be changed. This procedure is very time consuming and cumbersome for the following reasons:

a) During coincidence measurements, detectors 40 are positioned parallel to each other (see FIG. 2B).

b) In order to improve the resolution of the attenuation measurements, a collimator 54 is used on the detector side (see FIG. 2A). Coincidence measurements use no collimators on detectors (see FIG. 2B);

c) A "Filter" 56 (see FIGS. 2B), used in coincidence measurements contains a graded absorber 58 that selectively absorbs, and thus, protects the detectors from large flux of low energy, scattered, stray gamma photons. A line source 98 used in attenuation measurements is, for practical reasons, a source emitting low energy gamma photons (e.g., 100 keV Gd 153). These gamma photons cannot penetrate graded absorber 58.

Another class of problems concerns the conditioning (collimation) of the radiation from a line source in transmission attenuation measurements. Reference is now made to FIGS. 4A–4C. Collimation of line source radiation is performed in one of the following ways:

- if a collimation width 62 is larger than source 98 diameter 66, no substantial collimation exists (see FIG. 4A);
- if collimation width 62 is substantially the same as line source diameter 66, sensitivity related to manufacturing tolerances is maximal and non-uniform radiation is generated (see FIG. 4B); and
- if line source diameter 66 is larger than collimation width 62, and a loss of potential radioactivity 68 results. The smaller the ratio of the width of the slit to its length in the direction of the rays, the better the collimation and the greater the loss.

Yet another problem present in coincidence measurements concerns the lack of depth discrimination due to the finite thickness of the scintillation crystal.

Reference is now made to FIGS. 5A and 5B. In coincidence measurements, a true 68 or a calculated 68' line of flight of gamma photons 70 is determined by the location of a pair of interaction points 72, of both photons in a pair 76, with detectors scintillation crystals 42. The resolution of a detector in coincidence measurements depends on:

a) The detector intrinsic resolution, i.e., the ability of the detector to accurately determine location 72 of interaction of a gamma photon 70, with scintillation crystal 42. The thicker the crystal, the higher the probability that the photon interacts with the crystal. However, as is evident from FIGS. 5A and 5B, the detector intrinsic resolution is reduced with increasing thickness. In the absence of accuracy in depth discrimination, gamma photons 70 are assumed to interact with the scintillation crystal at its median 84;

b) The accuracy with which the gantry position is determined; and c) Loss of resolution due to reconstruction algorithms.

Of these three causes, the loss of resolution in depth discrimination, (shown as X on FIG. 5B), which strongly depends on incident angle 86 and is a function of crystal's thickness 80, is most important. In order to increase depth discrimination in coincidence measurements, either the crystal thickness is reduced, or only those photons that have an angle of incidence 86, under a certain limit are counted, for example, by reducing the flux of photons with large angle of incidence.

"Septa" or "Filter" shields 56 (see FIGS. 2B, 3 and 6) have no substantial localization function per se. They only remove scattered gamma photons 60, with large axial incidence angle 86, most of which are not useful for PET and are rejected by the software. To provide this function, the septa are generally about 1 cm apart and have an acceptance angle of about 10 degrees. Prior art septa are placed parallel to the slices of the reconstructed 3D image. The limited collimation of the Septa indirectly improves resolution by reducing the effect of the lack of depth discrimination on location accuracy It is desirable, in PET, to improve gamma detectors efficiency by reducing the number of stray photons detected relative to the number of non-stray photons detected and to improve the depth discrimination in coincidence measurements without having to reduce the scintillation crystals thickness. It is also desirable to perform attenuation and coincidence measurements in sequence without moving or replacing parts of the imaging system and, in attenuation measurements, to reduce radioactivity losses due to line source diameter while using a large diameter source to improve statistics by increasing the total radiation while keeping the source strictly collimated.

SUMMARY OF THE INVENTION

It is an object of some preferred embodiments of the invention to improve Nuclear Medicine (NM) image quality in coincidence measurements such as in PET imaging.

It is an object of some preferred embodiments of the invention to improve NM detector efficiency in coincidence measurements by increasing the ratio of useful radiation to stray radiation reaching a detector.

It is an object of some preferred embodiments of the invention to provide an NM imaging apparatus, with a single collimator assembly, which allows for high resolution measurements with both higher energy and lower energy gamma photons. Preferably the higher energy photons are used for PET imaging and the lower energy photons are used for emission imaging. Preferably, at least one region of the collimator assembly has a plurality of apertures and preferably it allows for collimation in two different directions.

It is an object of some preferred embodiments of the invention to provide an NM imaging method that increases depth discrimination, preferably without reducing crystal thickness, in coincidence measurements. Preferably increase in depth discrimination is obtained by introducing transaxial collimation.

In accordance with a preferred embodiment of the present invention, the collimator assembly comprises at least two different regions preferably with different collimation capabilities.

In accordance with a preferred embodiment of the present invention, each of the regions of the collimator comprises a multitude of apertures.

In accordance with a preferred embodiment of the present invention, preferably one of the regions is a strip collimator. Preferably a second region of the collimator is a “Septa collimator.”

In accordance with some preferred embodiments of the present invention, the Septa collimator region preferably also has a graded absorber that reduces the flux of low energy scattered gamma photons.

In accordance with some preferred embodiments of the present invention, preferably one of the regions is a strip collimator while the other region contains a graded absorber with no septa.

In accordance with some preferred embodiment of the present invention, the strip collimator is an axial fan beam collimator.

It is an object of some preferred embodiments of the invention to provide a method of source collimation and a source collimator, which allows for the use of line source with a diameter larger than the collimation width, without excessive loss of radiation.

In accordance with some of preferred embodiments of the present invention, the source collimator has many apertures distributed in a plurality of rows. Preferably the apertures are of rectangular shape.

There is thus provided, in accordance with a preferred embodiment of the invention, a gamma ray collimator assembly comprising a first collimator portion and a second collimator portion, said first and second portions having different gamma ray acceptance angles.

In a preferred embodiment of the invention, the collimator portions are formed by spaced septa and wherein the septa spacing is different for the two collimator portions. Preferably, the collimator portions pass radiation received from different regions. Preferably, the first and second collimator portions are designed for operation with gamma rays of different energies. Preferably, the first and second collimator portions are secured in a single frame. Preferably, the first and second collimator portions are positioned side by side, having openings in the same direction.

Preferably, the first collimator portion lies adjacent one edge of the collimator assembly. Preferably, the first collimator portion lies along substantially said entire edge of the assembly.

In a preferred embodiment of the invention, the assembly comprises an acceptance area within which gamma rays are passed and the first collimator portion covers a smaller portion of the acceptance area than does the second collimator portion.

Preferably, the first collimator portion has a substantially lower acceptance angle than does the second collimator portion. Preferably, the acceptance angle of the first collimator portion is between 0.2 and 5 degrees, more preferably between 0.5 and 3 degrees.

Preferably, the first collimator portion is designed to collimate gamma rays having an energy of between about 70 and 150 keV.

In a preferred embodiment of the invention, the second collimator portion is comprised of strips which block radiation, disposed parallel to each other.

Preferably, the second collimator portion has a relatively high acceptance angle as compared to that of the first portion. Preferably, the acceptance angle for the second collimator portion is between about 5 and 30 degrees, more preferably, between about 7 and 20 degrees.

In a preferred embodiment of the invention, the second collimator portion is designed to operate with gamma rays having an energy of between 400 and 600 keV more preferably, about 511 keV.

In a preferred embodiment of the invention, the energy at which the second collimator portion is designed to operate is at least twice, more preferably at least three times, most preferably at least five times, that at which the first collimator portion is designated to operate.

In a preferred embodiment of the invention, the first collimator portion is substantially transparent to gamma rays having an energy at which the second collimator portion is designed to operate.

In a preferred embodiment of the invention the assembly includes a gamma ray absorber underlying the second collimator portion, said absorber being designed to absorb gamma rays having an energy lower than that at which the second collimator portion is designed to operate. Preferably, the absorber is graded.

In a preferred embodiment of the invention the second collimator portion is a two dimensional collimator. Preferably, the two dimensional collimator comprises apertures formed of a material at their peripheries that does not transmit gamma rays having an energy at which the second collimator portion is designed to operate. In a preferred embodiment of the invention, the apertures are substantially rectangular apertures. Alternatively, the apertures have a non-rectangular shape.

There is further provided, in accordance with a preferred embodiment of the invention, a gamma ray collimator assembly comprising a collimator portion, and an absorber portion, said absorber portion covering a substantially greater portion of the collimator assembly than the collimator portion. Preferably, the collimator portion is designed to collimate gamma rays having a first, relatively low energy and wherein the absorber is designed to block gamma rays of said first energy and to pass gamma rays having a second, relatively higher energy. Preferably, the collimator portion and the absorber are secured in a single frame. Preferably, the collimator portion and the absorber are positioned side by side, facing in the same direction. Preferably, the collimator portion lies adjacent one edge of the collimator assembly, more preferably along substantially an entire edge of the assembly.

Preferably, the acceptance angle of the collimator portion is between 0.2 and 5 degrees, more preferably the acceptance angle of the collimator portion is between 0.5 and 3 degrees. Preferably, the collimator portion is designed to collimate gamma rays having an energy of between about 70 and 110 keV. Preferably, the absorber is designed to pass gamma rays used for PET imaging. Preferably, the PET imaging energy is about 511 keV. Preferably, the collimator is substantially transparent to gamma rays having the PET imaging energy. Most preferably, the absorber is graded.

There is further provided, in accordance with a preferred embodiment of the invention, a gamma ray collimator assembly for PET imaging comprising a two dimensional array of acceptance apertures said apertures being formed at their edges of a material through which gamma rays used for PET imaging do not pass. Preferably, the collimator has a relatively high acceptance angle. Preferably, the acceptance angle for the collimator between about 5 and 30 degrees, most preferably, the acceptance angle degrees.

In a preferred embodiment of the invention the collimator assembly includes a gamma ray absorber underlying the collimator, the absorber being designed to absorb gamma rays having an energy lower than that at which the collimator assembly is designed to operate. Preferably, the absorber is graded. Preferably, the apertures of the collimator are substantially rectangular apertures. Alternatively, the apertures have a non-rectangular shape.

There is further provided, in accordance with a preferred embodiment of the invention, a gamma ray imaging system comprising:

a. a gamma ray collimator assembly having a first collimator portion and a second collimator portion, said first and second portions having different acceptance angles and wherein the collimator portions are formed by spaced openings and wherein the septa openings are different for the two collimator portions; and b. a gamma ray detector wherein said gamma ray collimator assembly is positioned adjacent a gamma ray acceptance surface of the detector.

Preferably, the collimator assembly covers substantially the entire detector surface.

There is further provided, in accordance with a preferred embodiment of the invention, a gamma ray imaging apparatus comprising more than one gamma ray imaging system wherein the first and second collimator portions are designed for operation with gamma rays of different energies. Preferably, the gamma ray imaging apparatus further comprises a line source positionable opposite detector. Preferably, the first and second collimator portions are designed for operation with gamma rays of different energies. Preferably, the first and second collimator portions cover substantially the entire detector surface. Preferably, the first and second collimator portions are designed for operation with gamma rays of different energies.

There is further provided, in accordance with a preferred embodiment of the invention, an apparatus comprising:

a. a line source having a given width and length; and b. a plurality of apertures opposite to the line source.

Preferably, the apertures are narrower than the line source width and are distributed in the direction of the width of the source, more preferably, the apertures are distributed in a plurality of rows running along the length of the length of the source.

There is further provided, in accordance with a preferred embodiment of the invention, a method of improving depth discrimination in PET measurements comprising:

a. providing an area detector; and b. providing a collimator at the detector that blocks gamma photons having an incident transaxial angle larger than a predetermined value.

Preferably, the method improves detector efficiency in PET measurements and more preferably, the collimator also blocks gamma photons with an axial incident angle larger than a predetermined value.

There is further provided, in accordance with a preferred embodiment of the invention, a method of performing attenuation and coincidence measurements sequentially comprising:

a. providing at least one area detector;

b. providing at least one collimator, covering part of at least one detector;

c. irradiating a patient with gamma radiation from a source positioned opposite the detector;

d. collimating a flux of the gamma radiation passing through the patient from the source;

e. detecting the collimated flux utilizing the portion of the area detector covered by the collimator;

f. determining a two dimensional attenuation map of at least a portion of the patient from the detected flux; and g. performing a PET imaging sequence without removing the collimator.

There is further provided, in accordance with a preferred embodiment of the invention, dual energy imaging apparatus for simultaneous imaging of relatively low energy and relatively high energy photons emitted by sources of radiation, comprising:

at least one detector which produces signals responsive to high and low energy events throughout a given time period;

a collimator situated between a detector of the at least one detectors and the source, wherein the collimator collimates the low energy photons and is relatively transparent to the high energy photons;

a dual energy detector, which receives the signals and determines therefrom whether the signal was generated by a relatively low energy photon or a relatively high energy photon;

an image processing system that separately processes the high energy signals and the low energy signals to produce images based on the detected high energy and low energy photon.

Preferably, the collimator is substantially transparent to the high energy photons.

In a preferred embodiment of the invention, the high energy image is a PET image. Alternatively, the high energy image is a SPECT image. In a preferred embodiment of the invention the high energy image is a planar image. In a preferred embodiment of the high energy image is a transmission image.

In a preferred embodiment of the invention, the low energy image is a SPECT image. Alternatively, the low energy image is a planar image. In a preferred embodiment of the invention, the low energy image is a transmission image.

Preferably, the at least one detector comprises a pair of planar detectors.

In a preferred embodiment of the invention the apparatus includes a high energy collimator situated between the detector and the sources of radiation, one of said high energy and low energy detectors overlying the other.

In a preferred embodiment of the invention, the detectors have photon acceptance faces that are parallel to each other. Alternatively, the detectors have photon acceptance faces that are perpendicular to each other. Alternatively, the detectors have photon acceptance faces that are oriented at an angle different from 0 and 90 degrees with respect to each other.

There is further provided, in accordance with a preferred embodiment of the invention, a hybrid collimator for collimating high energy photons and low energy photons in gamma cameras, comprising:

a first collimator which collimates low energy photons and is relatively transparent to high energy photons; and a second collimator that collimates high energy photons wherein one of the first and second collimators underlies the other of the first and second collimators overlies the other.

Preferably, the second collimator is a PET collimator.

Preferably, the second collimator is suitable for use in SPECT and planar nuclear medicine images. The invention will be more clearly understood from the following detailed description of non-limiting preferred embodiments thereof, read in conjuction with the drawings in which:

DETAILED DESCRIPTION OF PREFERRED EMBODIMENTS

Figure 1:
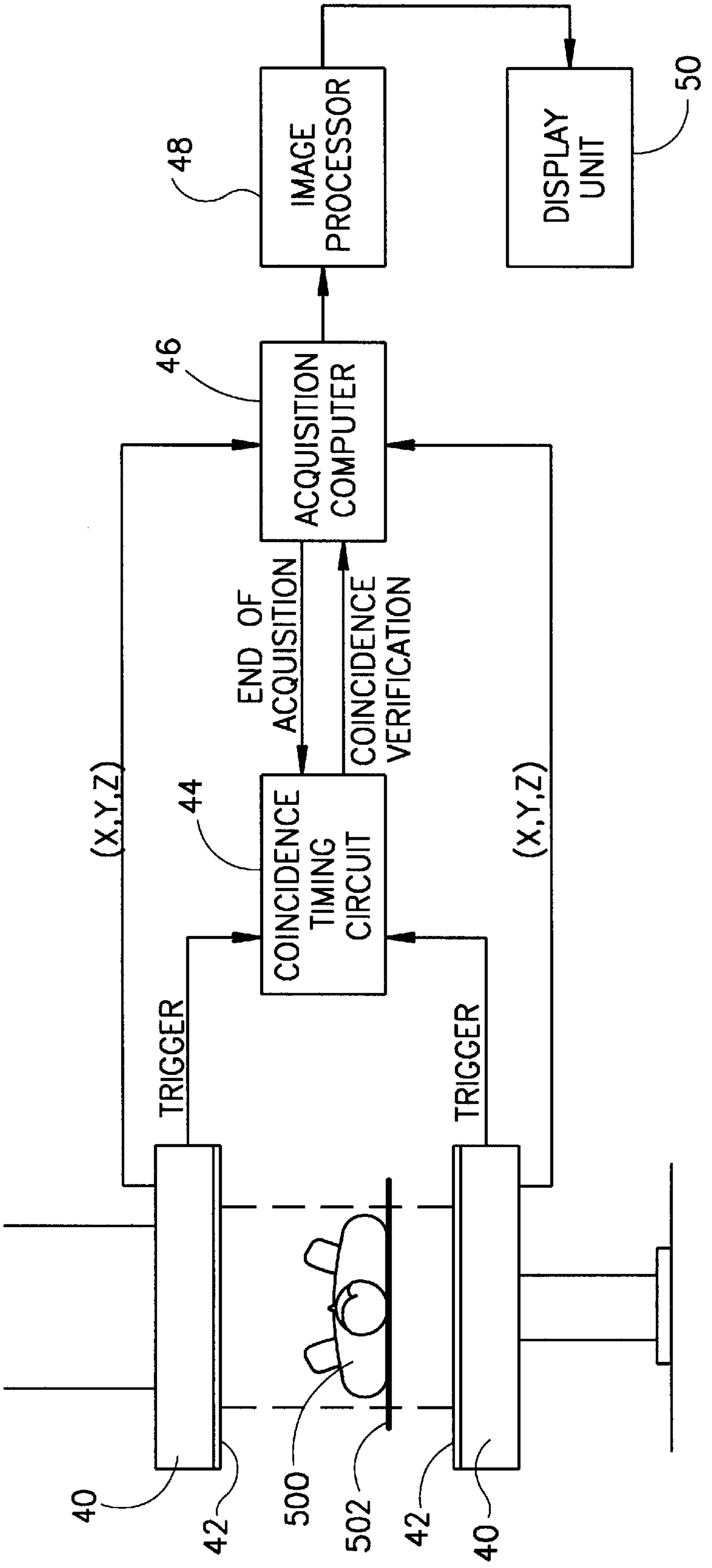
FIG. 1 shows a general block diagram of an embodiment used in accordance with medical coincidence measurements of prior art and the present invention.

FIG. 1 shows a block diagram of a system used in accordance with medical coincidence measurements of the prior art and in the present invention. A pair of gamma detectors 40, each optically coupled to a scintillation crystal 42, are disposed parallel to each other. Detector pair 40 is preferably mounted on a gantry that can rotate about a patient 500 resting on a table 502. Additionally, either detector pair 40 or patient 500 can be transversely displaced in the direction perpendicular to the plane of the figure. This configuration allows for total body scanning and/or static imaging, both well-known techniques in NM coincidence measurements.

System hardware and software, schematically described in FIG. 1 by blocks 44–50, allows for coincidence measurements in accordance with technology well known in the art. Thus, no further details on system operation will be given in the description of preferred embodiments in accordance with the present invention, except for distinctive features of the invention. This hardware generally includes an energy discriminator that rejects events having a low energy. Such events are presumed to be caused by scatter.

Figure 7A:
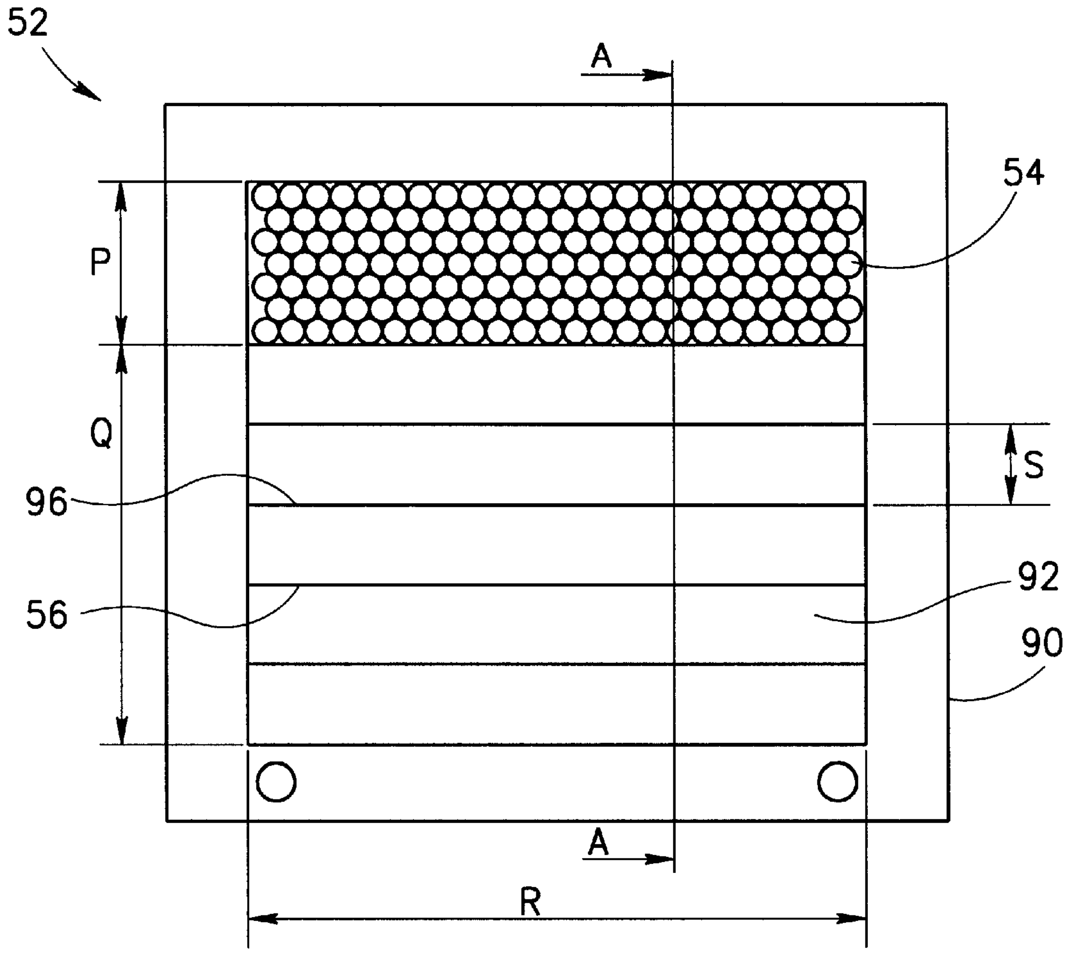
FIG. 7A and 7B represent, respectively, a top view and a side view of a preferred embodiment of a collimator assembly in accordance with a preferred embodiment of the present invention.
Figure 7B:
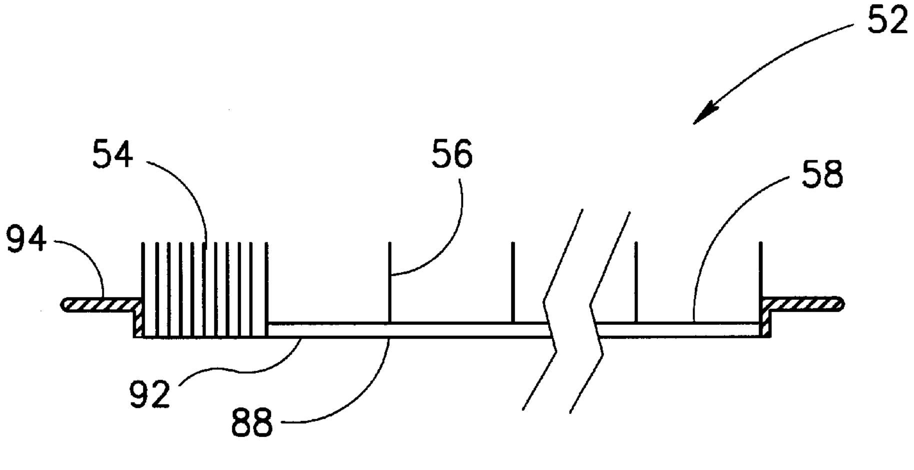

FIG. 7A and 7B show respectively a top and a sectional view of a shield 52 in accordance with a preferred embodiment of the present invention. Shield 52 preferably has two distinct regions, namely strip collimator 54 and wide area region 92, which have a common frame 88 preferably made of aluminum. Strip collimator 54 preferably comprises a plurality of apertures having an acceptance angle of between 0.2 and 5 degrees, more preferably about 2 degrees. Preferably, wide area region 92 comprises a plurality of septa 56 that preferably block stray radiation having a large axial incident angle. As stray radiation includes many gamma photons with large angle of incidence, the septa may also be regarded as collimating and blocking of such radiation in the direction parallel to septa's long side 96. Therefore, the term "septa collimator" is interchangeably used herein with "septa". Exemplary dimensions for collimator assembly 52 are: P =5 cm, Q =35 cm, R =54 cm, S=1 cm (see FIG. 7A). The acceptance angle of the septa collimator is preferably between 5 and 30 degrees, more preferably about 10 degrees. The slice spacing for reconstruction varies, but in general is only a fraction of S.

In accordance with a preferred embodiment of the present invention, wide area region 92 is preferably covered by a graded absorber 58 that prevents low energy gamma photons from reaching detectors 40. Additionally or alternatively, part of base 88 situated immediately under wide area region 92 is not covered by graded absorber 58.

Figure 8A:
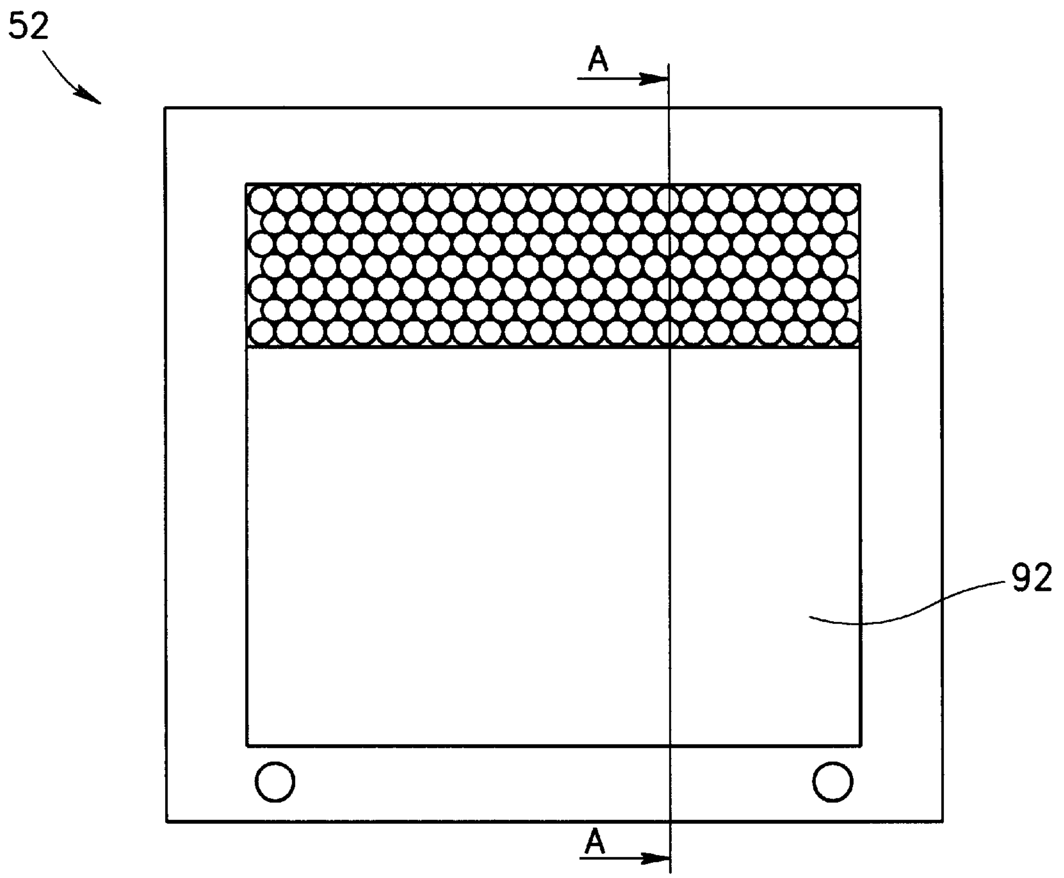
FIG. 8A and 8B represent respectively a top view and a sectional view of a preferred embodiment of a collimator assembly having no collimation function in its wide area region, in accordance with a preferred embodiment of the present invention.
Figure 8B:
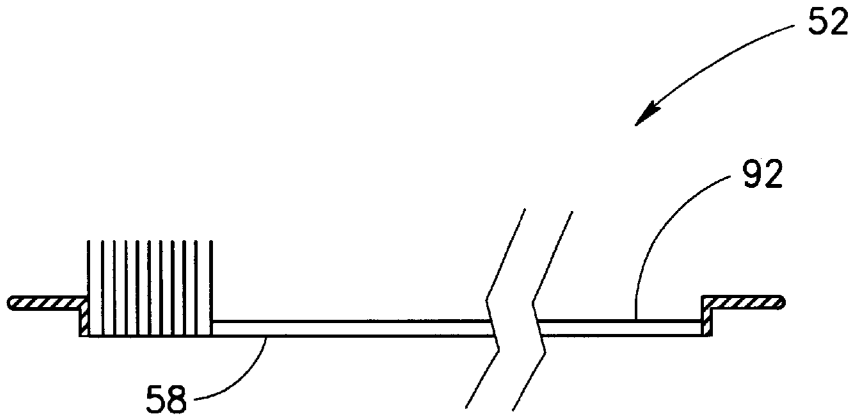

FIGS. 8A and 8B respectively show a top and a side view of shield 52 in accordance with a preferred embodiment of the present invention, in which part of frame 88 corresponding to wide area region 92, is covered by graded absorber 58 and does not comprise septa.

Figure 2A:
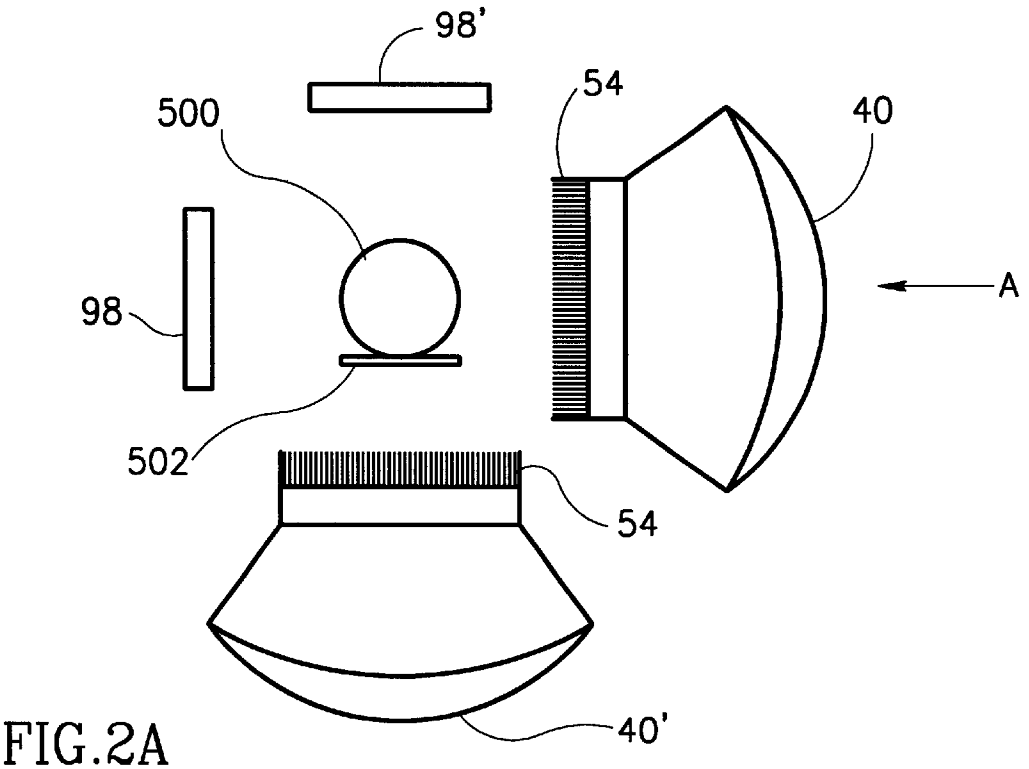
FIG.2A PRIOR ART
FIG. 2A schematically shows a prior art configuration for attenuation measurements with two gamma detectors positioned at 90 degrees.
Figure 9A:
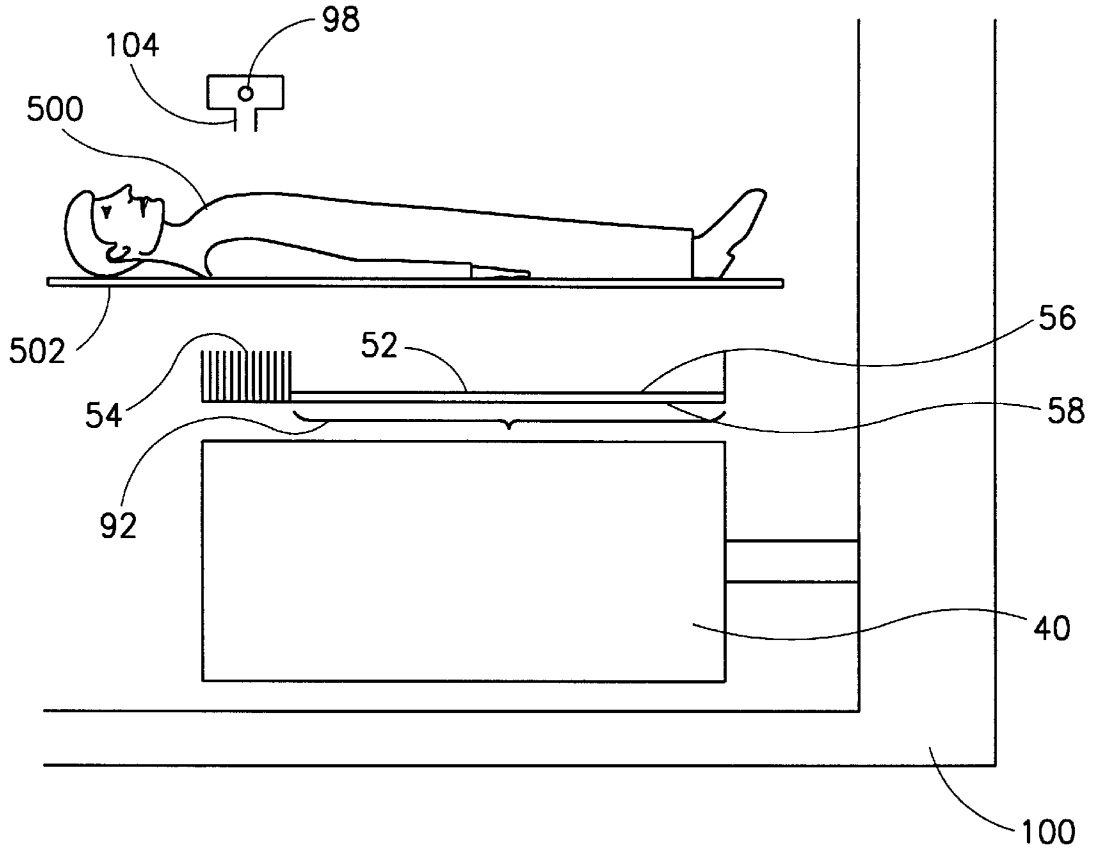
FIGS. 9A and 9B schematically show side views of preferred embodiments of a collimator as assembly used in attenuation and coincidence measurements respectively.
Figure 9B:
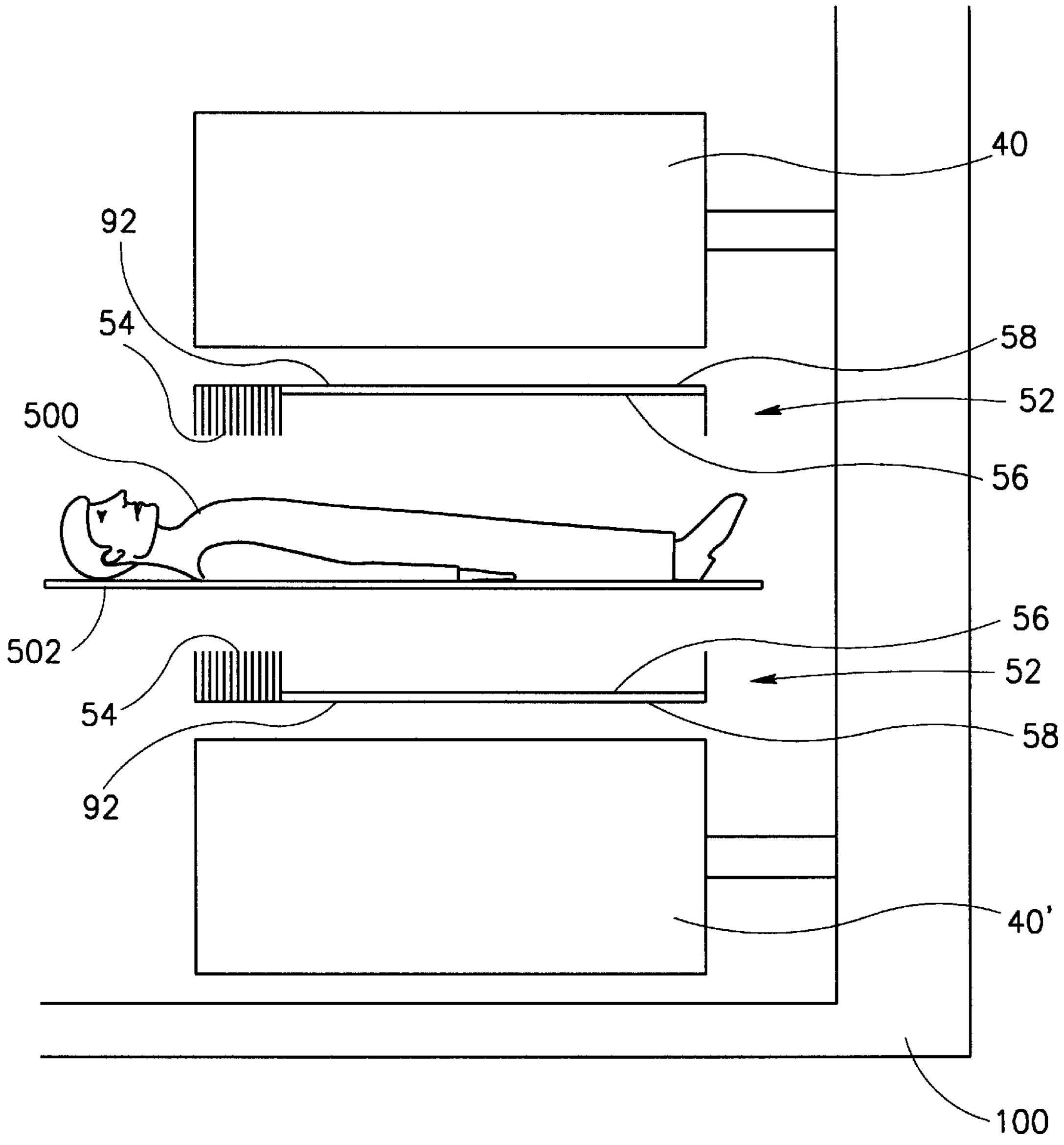

In accordance with a preferred embodiment of the present invention, shield 52 is preferably conceived, designed and manufactured as to comprise in one single mechanical and functional structure (see FIGS. 7A, 7B, 8A and 8B), collimator 54 and "Septa" 56. FIGS. 9A and 9B, schematically show shield 52 mounted on gamma detectors in accordance with a preferred embodiment of the present invention. FIGS. 9A and 9B are a side view, in the direction of arrow A, of embodiments illustrated in FIGS. 2A and 2B wherein collimator 54 and "Septa" 56 of FIGS. 2A and 2B have been replaced by shield 52. For reasons of clarity, head 40' and source 98' of FIG. 2A are not shown if FIG. 9A. All functional and structural descriptions given hereafter which refer to head 40 and/or source 98 are to be considered as equally applicable to both heads 40 and 40' as well as sources 98 and 98'.

Figure 13:
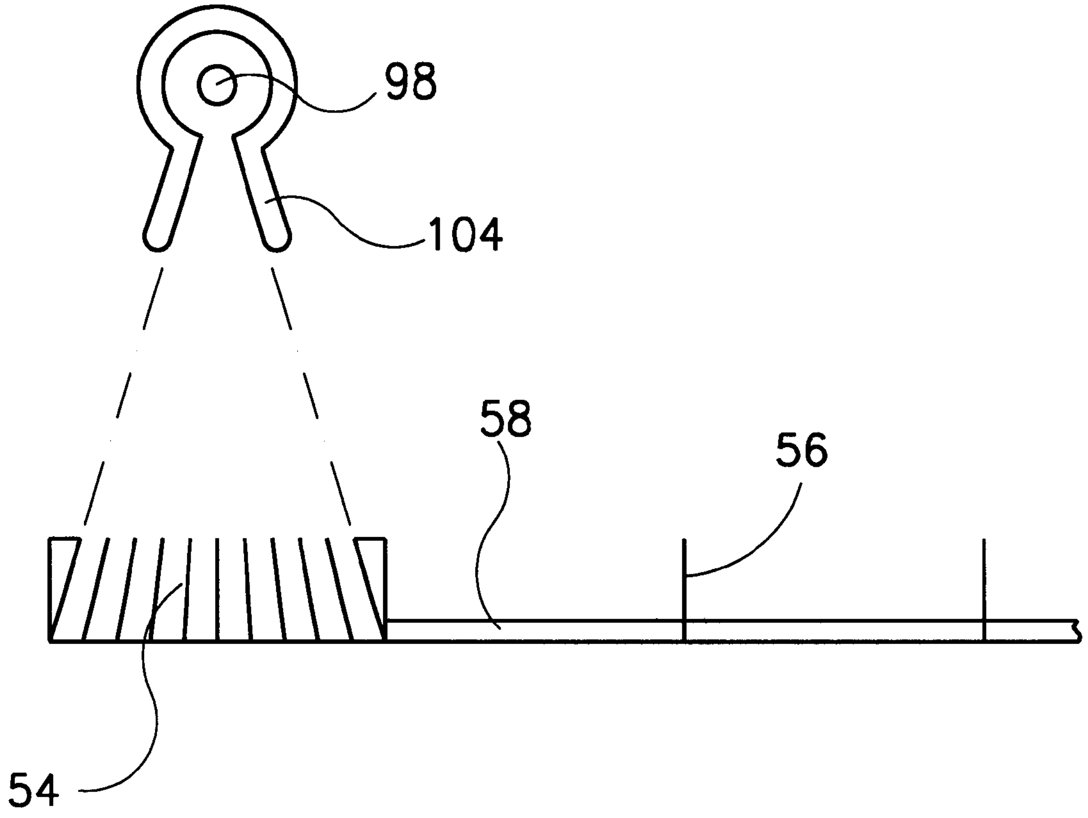
FIG. 13 schematically shows an axial fan beam collimator and a septa assembly opposite to a collimated line in accordance with preferred embodiments the present invention.

FIG. 9A schematically depicts a set up for transmission attenuation measurements in accordance with a preferred embodiment of the present invention. Collimated line source 98 is positioned opposite strip collimator 54 of shield 52, which covers detector 40. Strip collimator 54 and line source 98 may also have an axial fan beam shape as depicted in FIG. 13. During attenuation measurements, line source 98 and strip collimator 54 do not move relative to each other. Detector 40, shield 52 and line source 98 are mounted on a gantry 100 that can be rotated around patient 500.

To scan the patient in attenuation measurements, both heads 40 and 40' and sources 98 and 98' are rotated 90 degrees around the patient to complete imaging of one single slice. Then, bed 502 or patient 500 is laterally translated, preferably a distance equal to FWHM of transmitted radiation, to image the next slice. Axial rotation of gantry 100 and linear displacement of bed (with patient) are repeated until the entire region of interest is scanned. During this imaging session, only data from scintillations occurring behind strip collimator 54 are used.

Figure 2B:
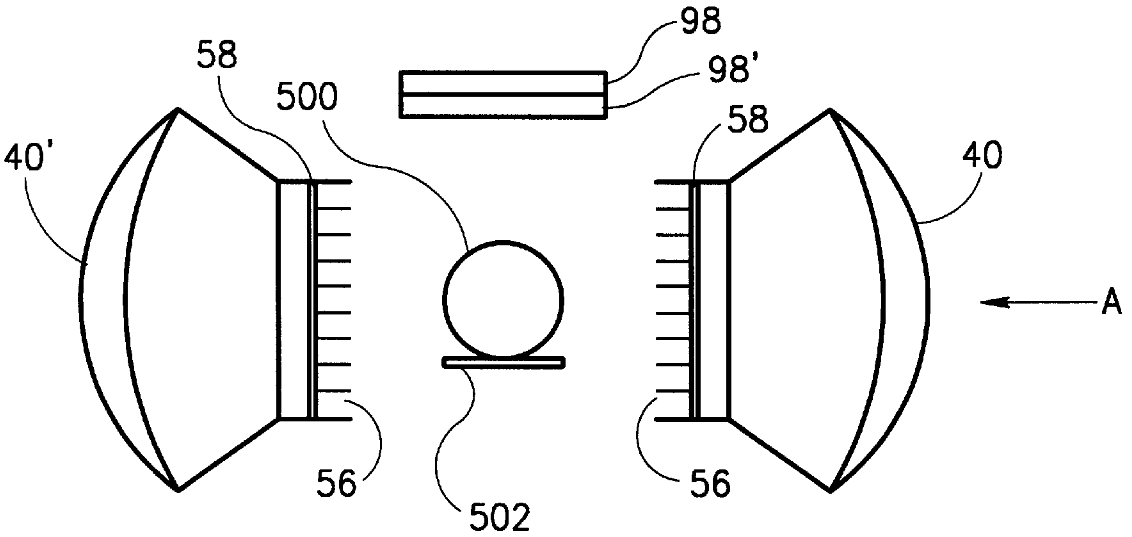
FIG.2B PRIOR ART
FIG. 2B schematically shows a prior art configuration for coincidence measurements with two gamma detectors positioned at 180 degrees.
Figure 3:
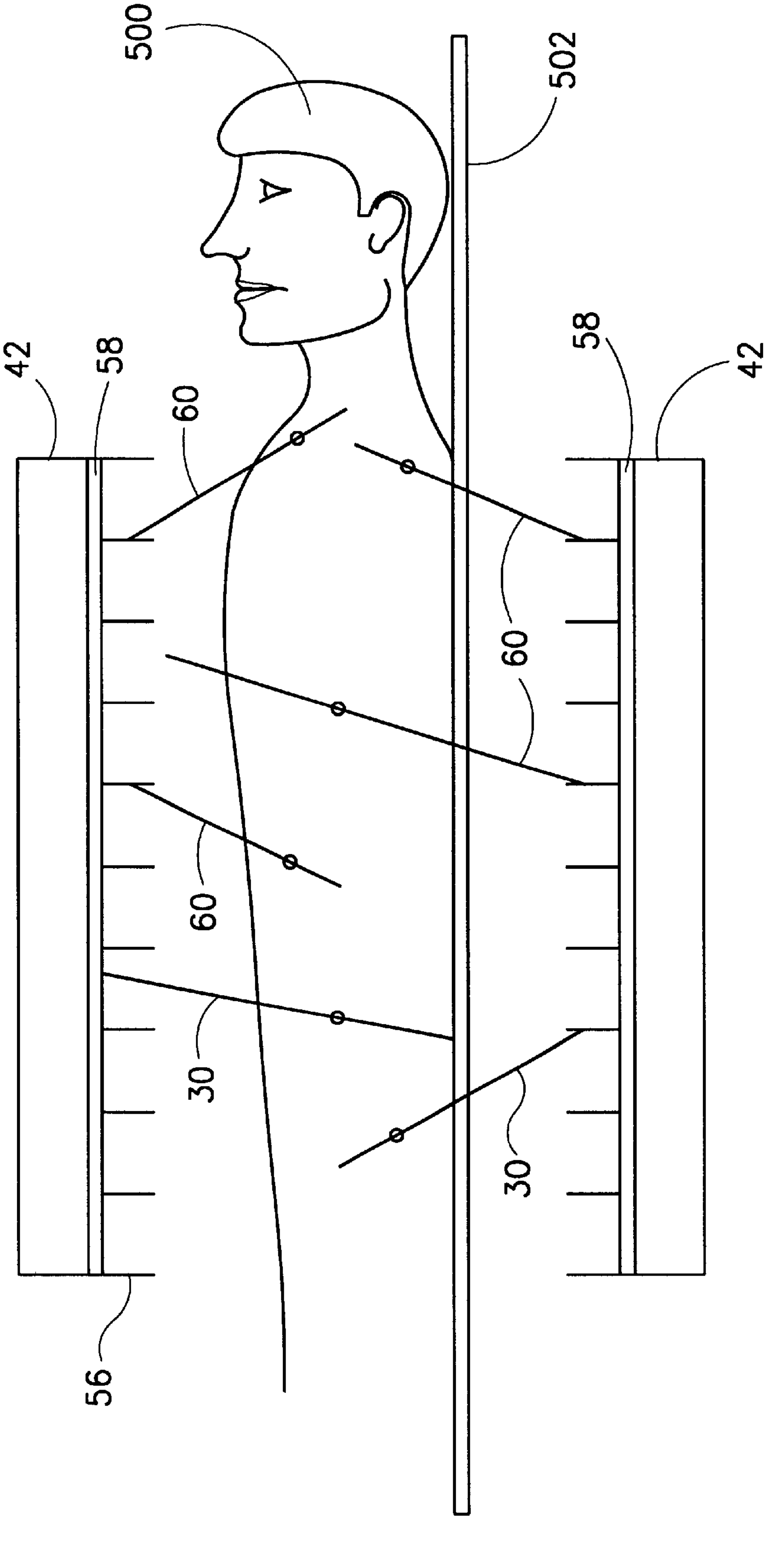
FIG.3 PRIOR ART
FIG. 3 schematically shows a "Scintillation Crystal-Septa" assembly used in prior art coincidence measurements, positioned relative to a patient.

At the end of the transmission attenuation measurements, head 40' and line source 98 in FIG. 2A are rotated 90 degrees clockwise to go from an "L" configuration (as in FIG. 2A), in which heads and line sources are positioned at 90 degrees relative to each other, to an "H" configuration of FIG. 2B, in which heads 40 and 40' are positioned opposite to each other while line sources 98 and 98' are parked one behind the other and closed so that no radiation emanates from them. Heads 40 and 40' are positioned so that "Septa" (or "Filter") 56, region of collimator assembly 52 is positioned opposite to the region of interest in patient's body as schematically shown in FIG. 9B. Preferably at this stage, the patient is injected with a radiopharmaceutical that contains a positron emitting substance that preferably selectively accumulates in an organ of interest in body 500.

Figure 5A:
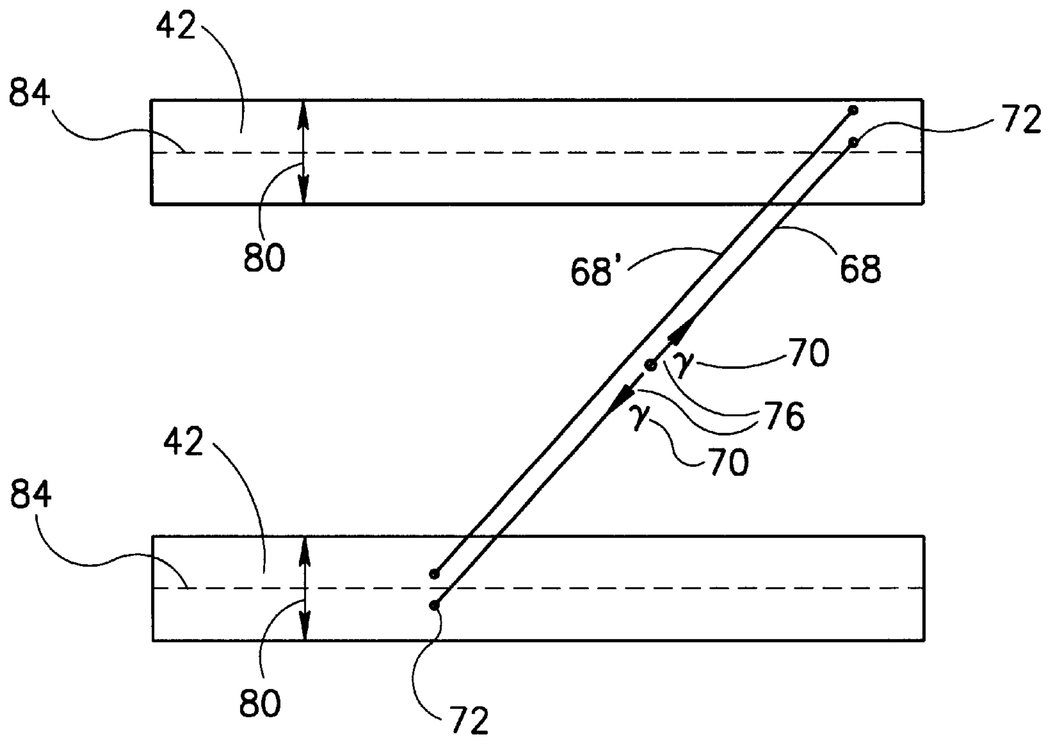
FIG.5A PRIOR ART
FIGS. 5A–5B schematically illustrates the events geometry of gamma photon pair interaction in scintillation crystals.
Figure 5B:
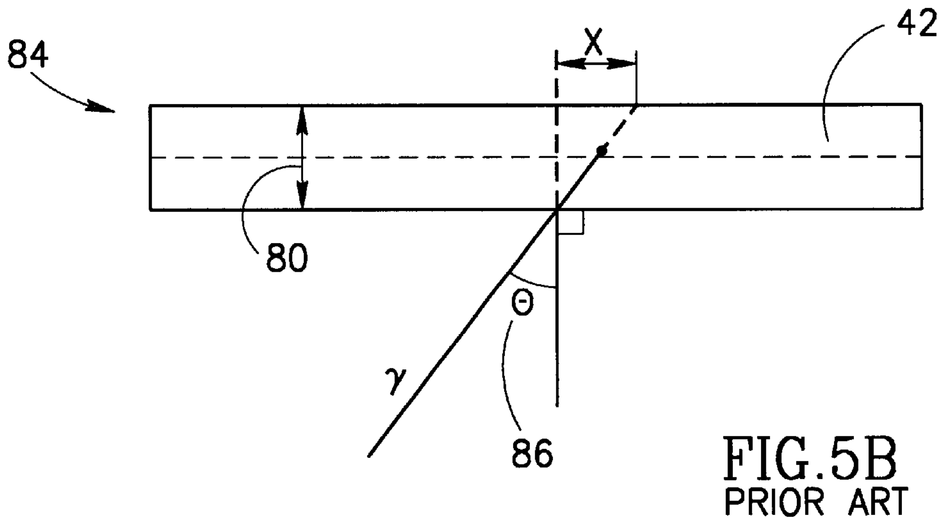
FIG.5B PRIOR ART
Figure 6:
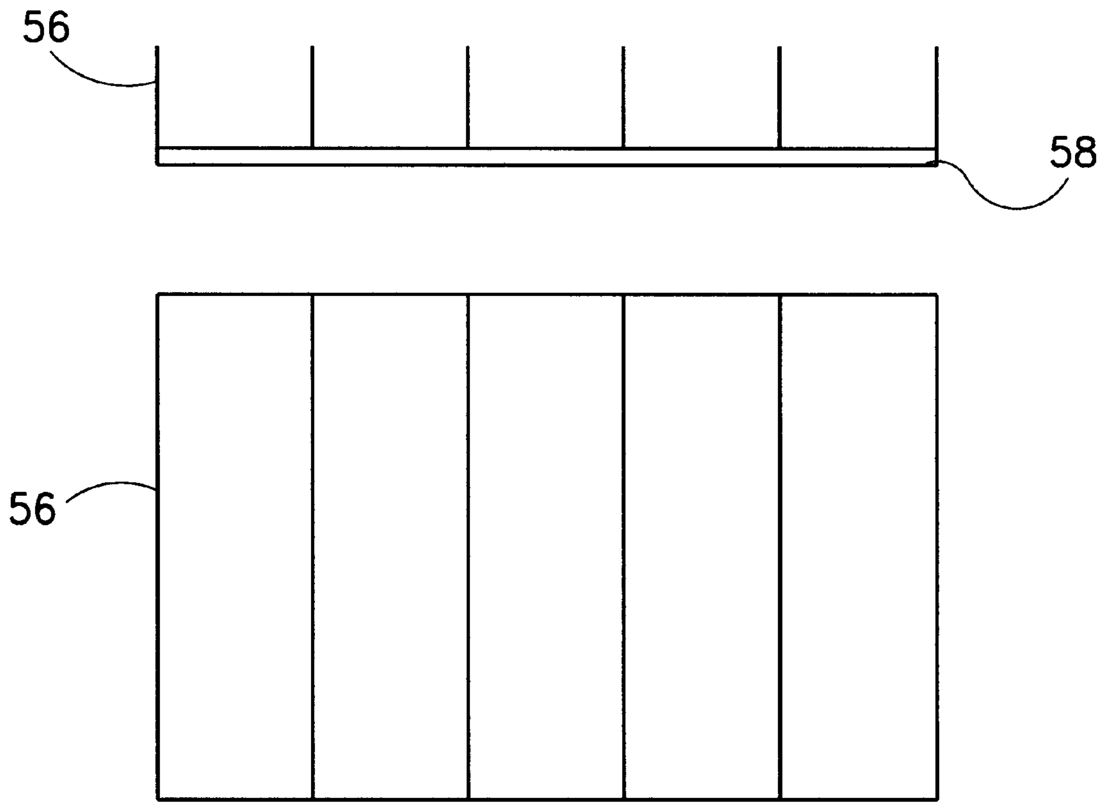
FIG.6 PRIOR ART
FIG. 6 illustrates a prior art "Septa"

Pairs of gamma photons emitted in opposite directions (see FIG. 5A) and indicative of annihilation of positrons emitted by the pharmaceutical, are collected by detectors 40 and 40' (see FIGS. 2A, 2B and 9B) for coincidence measurements. Heads 40 and 40' (FIG. 9B), are positioned with respect to the patient so that strip collimator 54 of collimator assembly 52 remains outside the border which delimits the region be imaged. During coincidence measurements, graded absorber 58 in "Septa" (or "Filter") preferably selectively removes low energy and generally large angle of incidence, patient body scattered, gamma photons. Heads 40 and 40' are preferably rotated at least 180 degrees during coincidence measurements. The images obtained for each projection angle at which heads 40 and 40' were positioned during the entire scanning process, are then used by system's software to reconstruct a 3D image of the region of interest.

Alternatively, strip collimator 54 is substantially transparent to the high energy (511 keV) gamma rays. In this case, the entire detector is utilized for the high energy measurements.

It is understood that neither the attenuation measurement sequences nor the coincidence measurements sequences, performed in accordance with a preferred embodiment of the present invention, are limited to what has been described above. Both measurements may be performed in static or dynamic configuration with or without rotational or transversal displacement of the gantry (heads 1 and 2), the line source or the bed on which the patient lies. Furthermore, helical scanning, in which the bed is laterally translated while heads 40 and/or 40', and line sources 98 and/or 98', are rotated around the patient may be used.

Figure 10A:
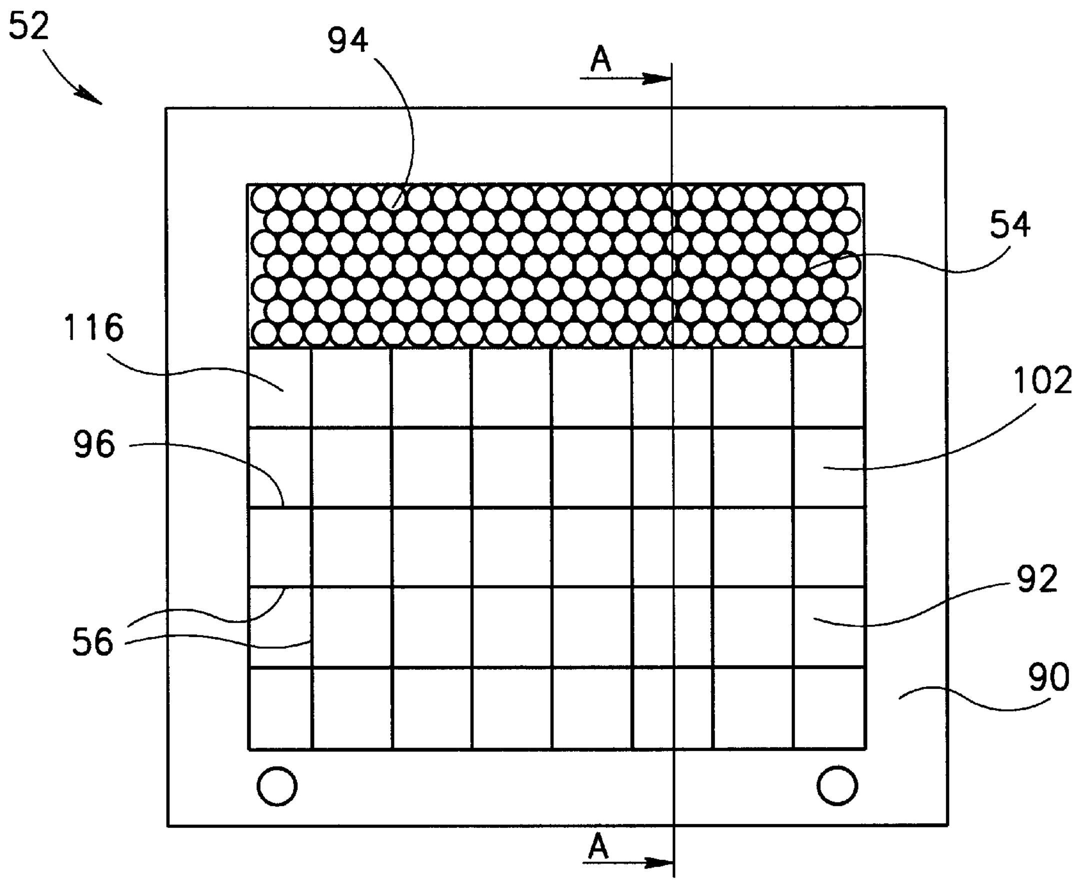
FIG. 10A and 10B respectively show a top view and a cross section view of a preferred embodiment of a collimator assembly comprising a strip collimator and a septa grid in accordance with a preferred embodiment of the present invention.
Figure 10B:
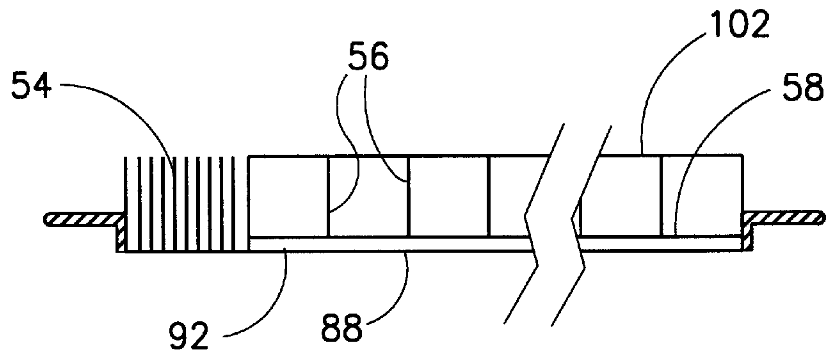

Further, in some preferred embodiments of the present invention, "Septa" 56 as shown in FIG. 7 are modified in order to increase system efficiency in coincidence measurements. Rejecting both gamma photons pairs and stray radiation with large angle of incidence, (for example larger than ±20 degrees in both axial and transaxial directions, increases the efficiency of the imaging system in coincidence measurements by increasing its resolution in depth discrimination in both directions. Thus, in accordance with a preferred embodiment of the present invention, crossed septa act as an axial and transaxial collimator. This modification, which is schematically showed in FIGS. 10A and 10B, is preferably made by replacing the one dimension septa structure of FIG. 7 by a crossed septa grid 102. The crossed septa grid consists of a plurality of substantially square or hexagonal apertures 116, in the wide area region 92 of collimator assembly 52 sketched in FIGS. 7A, 7B, 9A and 9B. Preferably, the dimensions of the apertures are variable and adjustable. Exemplary dimensions of the crossed septa grid is similar to that of the single direction septa of FIG. 7A.

Reference is again made to FIGS. 5A, 5B, 10A and 10B. Septa grid 102, comprising graded absorber 58, is in fact a partial collimator in both axial and transaxial directions. As such, it rejects scattered or coincidence gamma photons preferably with incidence angle larger than a certain value including many low energy gamma photons. By rejecting the scattered gamma photons and thus reducing useless gamma photons flux, septa grid 102, increases detector's efficiency through improvement of signal to noise ratio. By limiting the counted coincidence gamma photons, preferably, only to those with an angle of incidence below a certain value for example ±10 degrees, septa grid 102 also increases detector's efficiency in depth discrimination relative to annihilation events that take place inside an organ of interest.

It will be appreciated by a person skilled in the art that, descriptions and/or preferred embodiments detailed hereinbefore are only representative of their functionality. Any other combination of collimator assembly 52 comprising strip collimator and "Septa" or septa grid with or without graded absorber may be used in some of preferred embodiments of the present invention and should be regarded as pertaining to the present invention. In accordance with some preferred embodiments of the invention the (two-dimensional) septa grid may be used with or without strip collimator. The collimators described herein may equally be used in PET and/or PET-SPECT devices.

Figure 11:
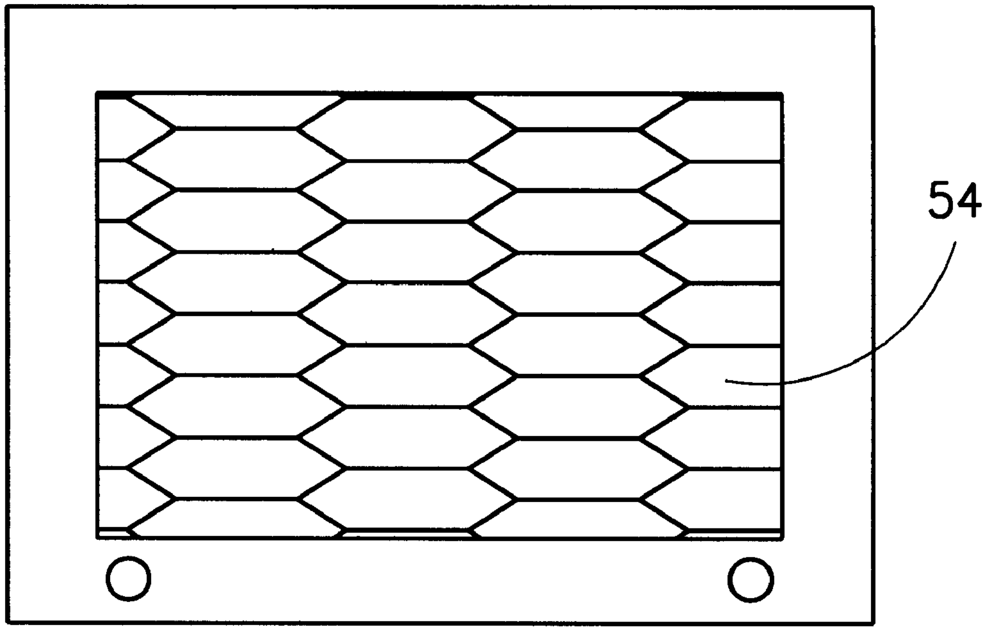
FIG. 11 schematically shows a septa grid with apertures of a different geometrical shape in accordance with preferred embodiments of the present invention.

Furthermore while square shaped openings are shown for the septa of FIG. 10, non-square openings may be used such as rectangular shaped openings (regular or with offset rows) and hexagonal shaped openings. An asymmetric hexagonal septa system is shown in FIG. 11.

Furthermore while regular circular openings as shown for strip collimator 54, other shaped openings, as known in the art, may be substituted.

Figure 4A:
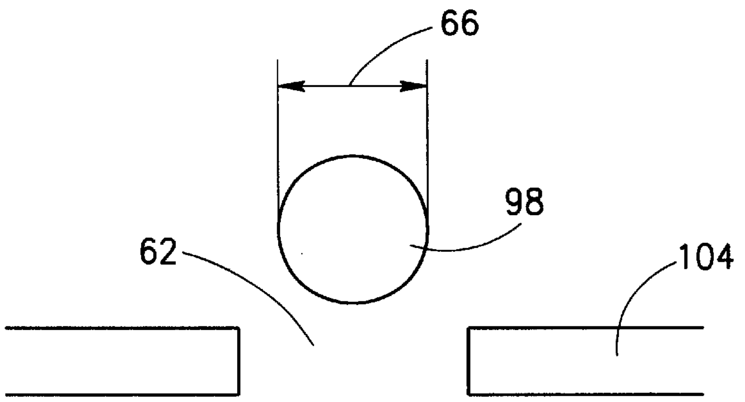
FIG.4A PRIOR ART
FIGS. 4A–4C schematically show different prior art geometries for line source collimation.
Figure 4B:
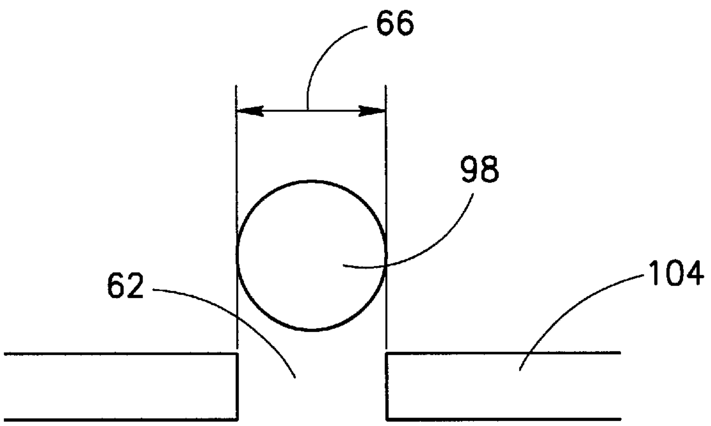
FIG.4B PRIOR ART
Figure 4C:
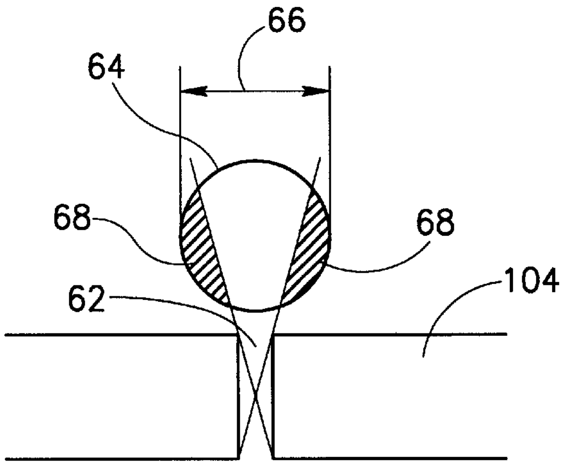
FIG.4C PRIOR ART
Figure 12A:
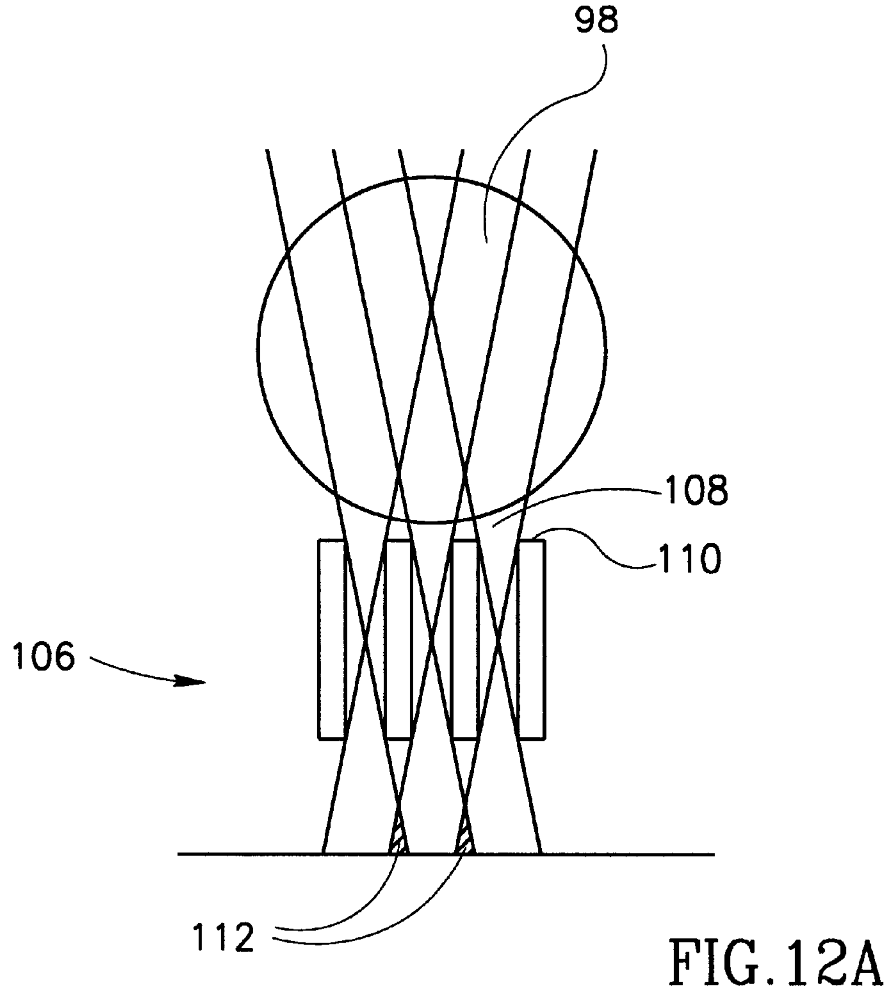
FIGS. 12A and 12B respectively represent a side view and a top view of a source collimator which comprises a plurality of apertures distributed in a plurality of rows, in accordance with preferred embodiments of the present invention.
Figure 12B:
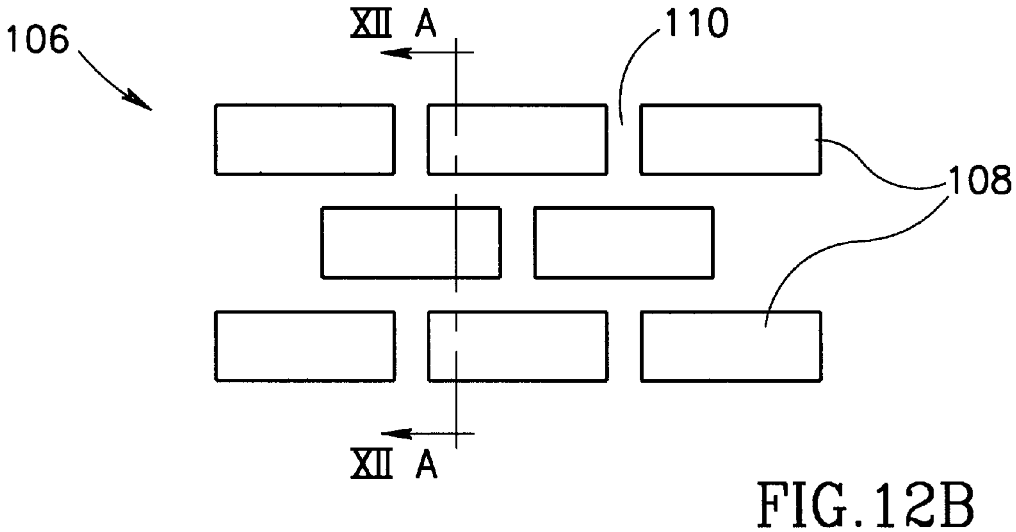

In some of preferred embodiments of the present invention, line source 98 in FIGS. 2A or 9A is collimated by a line collimator. In order to overcome the above mentioned problems related to radiation because of geometry, an improved collimator, as shown in FIG. 12 is preferably used. In some preferred embodiments of the present invention, line source 98 is collimated by an improved collimator 106 having a plurality of apertures preferably distributed in a plurality of rows. Preferred embodiments designed and manufactured in accordance with the configuration shown in FIG. 12B allow for simultaneous collimation in planes parallel to both long and short dimensions of line source 98 (whose axis runs from right to left in FIG. 12B). This collimation may (but need not) be the same in both directions. Thus, line source 98, which preferably has diameter larger than the width of a single aperture, and would otherwise be collimated by line collimator in accordance to description of FIG. 4C with large radioactivity losses, is collimated by collimator 106 (see FIGS. 12A and 12B) with minimal radioactivity losses. Preferably, septa material is such that penetration of gamma photons through walls 110 between apertures 118 is minimal. Additionally or alternatively, in some preferred embodiments of the present invention, walls 110 are as thin as possible in order to avoid nonuniformity of radiation 112 in regions of the irradiated area. While apertures 108 of collimator 106 are preferably substantially rectangular, they may be of any geometrical shapes.

Alternatively, the same principle of multi-hole collimators may be used to generate a fan beam running along the length of collimator 54 from a point source. In this configuration, collimator 54 would be a fan beam collimator focused at the point source (also the focus of the point collimator. Similarly, the same principle may be used to generate an efficient, well collimated point source of radiation from a relatively large "point" source.

In many cases one can obtain complementary information from simultaneous imaging of two isotopes, which emit radiation. A first important example is the simultaneous imaging of myocardium with a Tc99m (radiating at 140 keV) labeled radiopharmaceutical and an F18 (positron emitter radiating at 511 keV) labeled radiopharmaceutical. Two difficulties exist in such simultaneous imaging. One difficulty is that a collimator used must be suited to the high energy and will thus give poorer resolution of the low energy isotope than could be obtained if only it were used. Another difficulty is the low sensitivity of crystals suitable for low energy imaging when used to image the high energy gamma rays.

A second situation in which high and low energy imaging may be performed simultaneously is in the simultaneous acquisition of emission and transmission images. In such cases the emission image, which must be of high quality, is generally at a lower energy than the transmission image. Such imaging is performed for both PET images (in which, for example, the lower energy is 511 keV and the upper energy is 662 keV derived from a transmission source made of Cs 137) and for planar or SPECT images (in which, for example, the lower energy is 140 keV and the upper energy may be any suitable energy from 180 to 800 keV). Alternatively, in a third example, as described above, a transmission image for correcting PET images may be acquired using Tc99m at 140 keV, simultaneously with the PET image.

The efficiency and resolution of positron emitter imaging can be considerably improved by performing coincidence without a collimator or with a collimator with a large acceptance angle. Unfortunately, other isotopes and other imaging schemes require a collimator.

Figure 14:
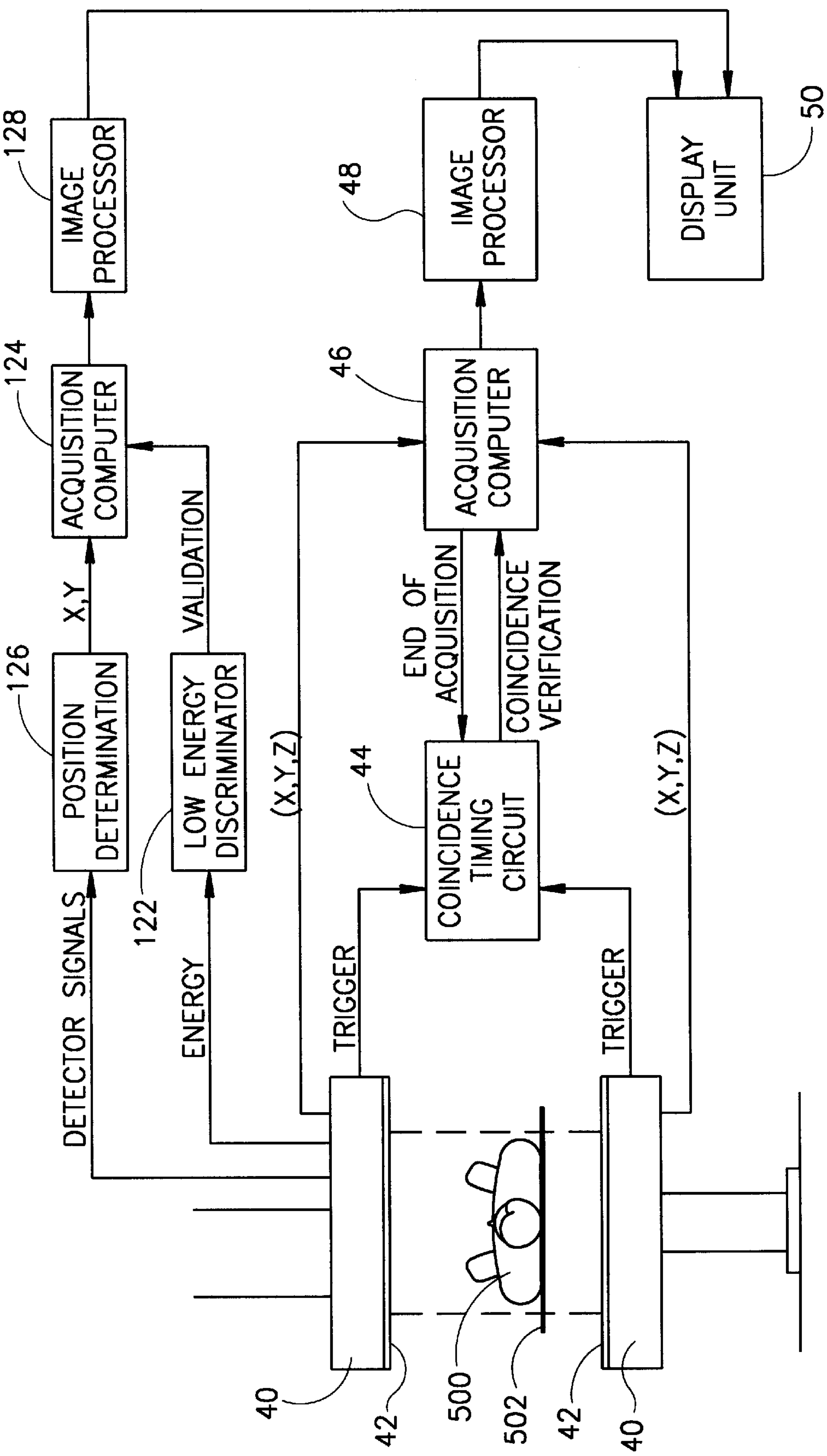
FIG. 14 is a schematic representation of a system for dual energy imaging in accordance with a preferred embodiment of the invention.

In accordance with a preferred embodiment of the invention, a camera is equipped with dual energy discrimination in the front end electronics. The camera utilizing a collimator optimized for low energy. Such collimators provide optimal low energy images and are, to a large extent, transparent to the high energy radiation. For the first example described above, the camera would image the Tc99m image utilizing the low energy collimator and the high energy PET image as though the collimator was not there. An example of such a system is shown in FIG. 14, which is similar to FIG. 1 and in which the same numerals are used for the same elements. FIG. 14 differs from FIG. 1 in a low energy collimator 120 mounted on each of crystals 42 and in having a separate low energy discriminator 122, which receives energy signals from detectors 40 and determines whether a detected event was generated by the low energy isotope used. If a low energy photo is detected, an acquisition processor 124 records the x and y positions of the event on the crystal as determined by circuitry 126. When sufficient data is acquired, image processor 128 produces either a planar or SPECT image from recorded events. This circuitry, which is preferably purely conventional in nature, is shown for only one of the crystals. However, such circuitry can be provided for both crystals. This is especially useful for SPECT imaging using the low energy, since it doubles the acquisition rate. In this case, a common acquisition computer may be used to acquire the data and/or a common image processor may be used to form the SPECT image. It should also be understood that, while a particular configuration of circuitry is shown in FIG. 14 and in others of the drawings, conventional circuitry having other configurations may be used in preferred embodiments of the invention, to perform various acquisition and image processing functions.

Considering again the first example described above, in cardiac imaging, usually only 180 degrees from the left posterior to the right anterior view are used in SPECT imaging, since they are the closest to the heart. In a preferred embodiment of the invention, one of the detectors in a dual head camera utilizes a low energy collimator and the other utilizes a high energy collimator. The low energy detector is used to image the heart utilizing the optimal angles, since the low energy radiation has the potential of rendering a high resolution image. The high energy image may be acquired at less optimal angles, if simultaneous imaging is desired, or may be acquired in the optimal position, by further rotation of the detectors. Note that the angle between the detectors may be 180 degrees or some other lesser angle.

Figure 15:
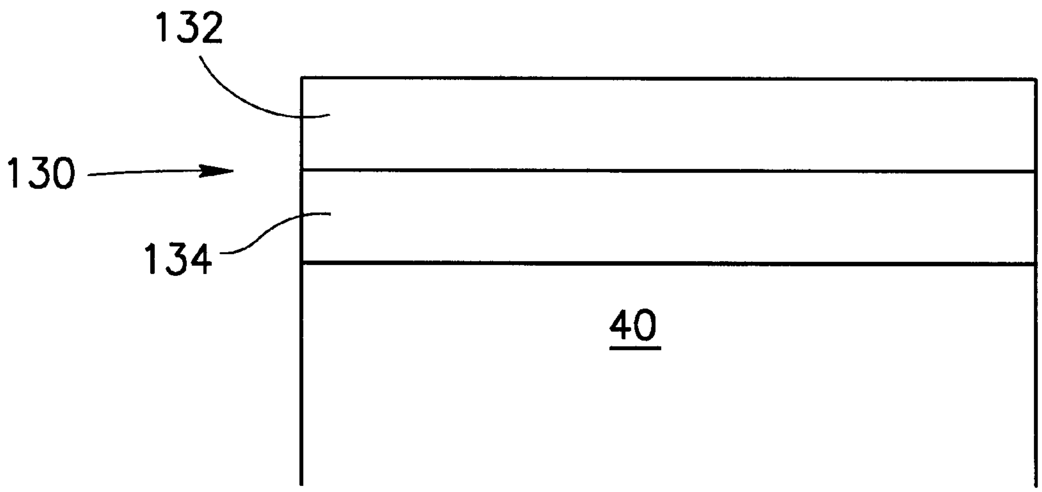
FIG. 15 is a hybrid collimator in accordance with a preferred embodiment of the invention.

In a further preferred embodiment of the invention, yet another collimation scheme similar to that shown in FIG. 14 is used. However, instead of low energy collimators 120 being used on both detectors a dual layer collimator 130, as shown in FIG. 15, is used. One layer 132 of this collimator is a low energy collimator as is known in the art and a second layer 134 is a high energy collimator as known in the art, or as described herein. Either layer can be above the other.

The above detailed descriptions and drawings of non-limiting preferred embodiments of the present invention, are only illustrative. Various combinations of features of collimators and scanning regimes described above may be used separately and in various combinations. The invention is not meant to be limited by the specific embodiments disclosed, but only by the claims in which:

What is claimed is:

1. A gamma ray collimator assembly comprising a first collimator portion and a second collimator portion, said first and second portions having different gamma acceptance angles and being designed for operation with gamma rays of different energies.

2. A gamma ray collimator assembly according to claim 1 wherein the collimator portions are formed by spaced openings and wherein the openings are different for the two collimator portions.

3. A gamma ray collimator assembly according to claim 2 wherein the collimator portions pass radiation received from different regions.

4. A gamma ray collimator assembly according to claim 2 wherein said first and second collimator portions are secured in a single frame.

5. A gamma ray collimator assembly according to claim 2 wherein said first and second collimator portions are positioned side by side, having openings in the same direction.

6. A gamma ray collimator assembly according to claim 2 wherein said first collimator portion lies adjacent to one edge of the collimator assembly.

7. A gamma ray collimator assembly according to claim 6 wherein the first collimator portion lies substantially along an entire edge of the assembly.

8. A gamma ray collimator assembly according to claim 2 having an acceptance area within which gamma rays are passed and wherein the first collimator portion covers a smaller portion of the acceptance area than does the second collimator portion.

9. A gamma ray collimator assembly according to claim 2 wherein the first collimator portion has a substantially lower acceptance angle than does the second collimator portion.

10. A gamma ray collimator assembly according to claim 9 wherein the acceptance angle of the first collimator portion is between 0.2 and 5 degrees.

11. A gamma ray collimator assembly according to claim 10 wherein the second collimator portion has a relatively high acceptance angle as compared to that of the first portion.

12. A gamma ray collimator assembly according to claim 11 wherein the acceptance angle for the second collimator portion is between about 5 and 30 degrees.

13. A gamma ray collimator assembly according to claim 12 wherein the acceptance angle for the second collimator portion is between about 7 and 20 degrees.

14. A gamma ray collimator assembly according to claim 9 wherein the acceptance angle of the first collimator portion is between 0.5 and 3 degrees.

15. A gamma ray collimator assembly according to claim 9 wherein said second collimator portion is a two dimensional collimator.

16. A gamma ray collimator assembly according to claim 15 wherein said two dimensional collimator comprises apertures defined at their peripheries by a material which does not transmit gamma rays having an energy at which the second collimator portion is designed to operate.

17. A gamma camera assembly according to claim 16 wherein said apertures are substantially rectangular apertures.

18. A gamma ray collimator assembly according to claim 16 wherein said apertures have a non-rectangular shape.

19. A gamma ray collimator assembly according to claim 2 wherein the first collimator portion is designed to collimate gamma rays having an energy of between about 70 and 150 keV.

20. A gamma ray collimator assembly according to claim 19 wherein the second collimator portion is designed to operate with gamma rays having an energy of between 400 and 600 keV.

21. A gamma ray collimator assembly according to claim 20 wherein the second collimator portion is designed to operate at an energy of about 511 keV.

22. A gamma ray collimator assembly according to claim 20 wherein the energy at which the second collimator portion is designed to operate is at least twice that at which the first collimator portion is designated to operate.

23. A gamma ray collimator assembly according to claim 20 wherein the energy at which the second collimator portion is designed to operate is at least three times that of the first collimator portion.

24. A gamma ray collimator assembly according to claim 20 wherein the energy at which the second collimator portion is designed to operate is at least four times that of the first collimator portion.

25. A gamma ray collimator assembly according to claim 20 wherein the energy at which the second collimator portion is designed to operate is about five times that of the first collimator portion.

26. A gamma ray collimator assembly according to claim 2 wherein the second collimator portion is comprised of strips which block radiation, disposed parallel to each other.

27. A gamma ray collimator assembly according to claim 1 wherein the first collimator portion is substantially transparent to gamma rays having an energy at which the second collimator portion is designed to operate.

28. A gamma ray collimator assembly according to claim 1 and including a gamma ray absorber underlying the second collimator portion, said absorber being designed to absorb gamma rays having an energy lower than that at which the second collimator portion is designed to operate.

29. A gamma ray collimator assembly according to claim 28 wherein said absorber is graded.

30. A gamma ray collimator assembly comprising a collimator portion, and an absorber portion, said absorber portion covering a substantially greater portion of the collimator assembly than the collimator portion wherein the collimator portion is designed to collimate gamma rays having a first, relatively low energy and wherein the absorber portion is designed to block gamma rays of said first energy and to pass gamma rays having a second, relatively higher energy.

31. A gamma ray collimator assembly according to claim 30 wherein the collimator portion and the absorber portion are secured in a single frame.

32. A gamma ray collimator assembly according to claim 30 wherein said collimator portion and said absorber portion are positioned side by side, facing in the same direction.

33. A gamma ray collimator assembly according to claim 30 wherein said collimator portion lies adjacent one edge of the collimator assembly.

34. A gamma ray collimator assembly according to claim 33 wherein the collimator portion lies along substantially an entire edge of the assembly.

35. A gamma ray collimator assembly according to claim 30 wherein the acceptance angle of the collimator portion is between 0.2 and 5 degrees.

36. A gamma ray collimator assembly according to claim 30 wherein the acceptance angle of the collimator portion is between 0.5 and 3 degrees.

37. A gamma ray collimator assembly according to claim 30 wherein the collimator portion is designed to collimate gamma rays having an energy of between about 70 and 110 keV.

38. A gamma ray collimator assembly according to claim 30 wherein the absorber portion is designed to pass gamma rays used for PET imaging.

39. A gamma ray collimator assembly according to claim 38 wherein the PET imaging energy is about 511 keV.

40. A gamma ray collimator assembly according to claim 38 wherein the collimator portion is substantially transparent to gamma rays having a PET imaging energy.

41. A gamma ray collimator assembly according to claim 30 wherein said absorber portion is graded.

42. A gamma ray collimator assembly for PET imaging comprising a collimator having a two dimensional array of acceptance apertures said apertures being formed at their edges of a material through which gamma rays used for PET imaging do not pass.

43. A gamma ray collimator assembly according to claim 42 wherein the collimator has an acceptance angle of between about 5 and 30 degrees.

44. A gamma ray collimator assembly according to claim 43 wherein the acceptance angle for the collimator is between about 7 and 20 degrees.

45. A gamma camera assembly according to claim 43 wherein said apertures are substantially rectangular apertures.

46. A gamma ray collimator assembly according to claim 43 wherein said apertures have a non-rectangular shape.

47. A gamma ray collimator assembly according to claim 42 and including a gamma ray absorber underlying the collimator, said absorber being designed to absorb gamma rays having an energy lower than that at which the collimator assembly is designed to operate.

48. A gamma ray collimator assembly according to claim 47 wherein said absorber is graded.

49. A gamma ray imaging system, comprising:

a) a gamma ray collimator assembly having a first collimator portion and a second collimator portion, said first and second portions having different acceptance angles and wherein the collimator portions are formed by spaced openings and wherein the openings are different for the two collimator portions; and b) a gamma ray detector wherein said gamma ray collimator assembly is positioned adjacent a gamma ray acceptance surface of the detector;

wherein the first and second collimator portions are designed for operation with different energies.

50. A gamma ray imaging system according to claim 49 wherein said collimator assembly covers substantially the entire gamma ray acceptance surface.

51. A gamma ray radiation imaging system according to claim 49 comprising a line source positionable opposite to said detector.

52. A gamma ray imaging system according to claim 49 comprising more then one gamma ray detector and associated collimator assembly wherein the first and second collimator portions are designed for operation with gamma rays of different energies.

53. Gamma ray imaging apparatus comprising more than one gamma ray imaging system having first and second collimator portions designed for operation with gamma rays of different energies.

54. Apparatus comprising:

a) a line source having a given width and length; and b) a collimator having a plurality of apertures formed therein opposite to the line source, wherein said apertures are narrower than the line source width and are distributed in the direction of the width of the line source.

55. Apparatus according to claim 54 wherein said apertures are distributed in a plurality of rows running along the length of the length of the source.

56. A method of improving depth discrimination in PET measurements comprising:

a) providing an area detector; and b) providing a collimator at the detector that blocks gamma photons having an incident transaxial angle larger than a predetermined value.

57. A method of improving detector efficiency in PET measurements according to claim 56 wherein the collimator also blocks gamma photons with an axial incident angle larger than a predetermined value.

58. A method of performing attenuation and coincidence measurements sequentially comprising:

a) providing a plurality of area detectors;

b) providing at least one collimator, covering a portion of at least one detector of said plurality of detectors;

c) irradiating a patient with gamma radiation from a source positioned opposite the at least one detector;

d) collimating a flux of the gamma radiation passing through the patient from the source;

e) detecting the collimated flux utilizing the portion of the at least one area detector covered by the collimator;

f) determining a two dimensional attenuation map of at least a portion of the patient from the detected flux; and g) performing a PET imaging sequence without removing the collimator.

59. Dual energy imaging apparatus for simultaneous imaging of relatively low energy and relatively high energy photons emitted by sources of radiation, comprising:

at least one detector which produces signals responsive to high and low energy events throughout a given time period;

a collimator situated between a detector of the at least one detectors and a source of high and low energy photons, wherein the collimator collimates the low energy photons and is relatively transparent to the high energy photons;

a dual energy detector, which receives the signals and determines therefrom whether the signal was generated by a relatively low energy photon or a relatively high energy photon;

an image processing system that separately processes the high energy signals and the low energy signals to produce images based on the detected high energy and low energy photon.

60. Apparatus according to claim 59 wherein the collimator is substantially transparent to the high energy photons.

61. Apparatus according to claim 59 wherein the high energy image is a PET image.

62. Apparatus according to claim 59 wherein the high energy image is a SPECT image.

63. Apparatus according to claim 59 wherein the high energy image is a planar image.

64. Apparatus according to claim 59 wherein the high energy image is a transmission image.

65. Apparatus according to claim 59 wherein the low energy image is a SPECT image.

66. Apparatus according to claim 59 wherein the low energy image is a planar image.

67. Apparatus according to claim 59 wherein the low energy image is a transmission image.

68. Apparatus according to claim 59 wherein the at least one detector comprises a pair of planar detectors.

69. Apparatus according to claim 68 wherein the detectors have photon acceptance faces that are parallel to each other.

70. Apparatus according to claim 68 wherein the detectors have photon acceptance faces that are perpendicular to each other.

71. Apparatus according to claim 68 wherein the detectors have photon acceptance faces that are oriented at an angle different from 0 and 90 degrees with respect to each other.

72. Apparatus according to claim 59 and including a high energy collimator situated between the at least one detector and the sources of radiation, one of said high energy and low energy collimators overlying the other.

73. A hybrid collimator for collimating high energy photons and low energy photons in gamma cameras, comprising:

a first collimator which collimates low energy photons and is relatively transparent to high energy photons; and a second collimator that collimates high energy photons wherein one of the first and second collimators underlies the other of the first and second collimators.

74. A hybrid collimator according to claims 73 wherein the second collimator is a PET collimator.

75. A hybrid collimator according to claim 74 wherein the first collimator is suitable for use in SPECT and planar nuclear medicine images.

* * * * *